(12) United States Patent
Reese et al.

(10) Patent No.: US 6,373,939 B1
(45) Date of Patent: Apr. 16, 2002

(54) MACHINE ASSISTED SYSTEM FOR PROCESSING AND RESPONDING TO REQUESTS

(75) Inventors: Ralph H. Reese, Pittsburgh, PA (US); Alan Truitt, Draper, UT (US)

(73) Assignee: Communications and Commerce Corporation, Murray, UT (US)

(*) Notice: Subject to any disclaimer, the term of this patent is extended or adjusted under 35 U.S.C. 154(b) by 0 days.

(21) Appl. No.: 09/378,515

(22) Filed: Aug. 20, 1999

(51) Int. Cl.$^7$ ............................................... H04M 11/00
(52) U.S. Cl. ............................. 379/266.1; 379/265.02; 379/88.23; 379/88.16
(58) Field of Search ........................... 379/88.01, 88.08, 379/88.11, 88.12, 88.13, 88.16, 88.17, 88.19, 88.2, 88.21, 308, 309, 88.27, 218.01, 265.01, 265.02, 265.11, 266.01, 266.1, 917, 88.22, 88.23, 88.25

(56) References Cited

U.S. PATENT DOCUMENTS

| | | | |
|---|---|---|---|
| 5,179,585 A | * | 1/1993 | MacMillan, Jr. et al. |
| 5,239,462 A | | 8/1993 | Jones et al. |
| 5,299,260 A | * | 3/1994 | Shaio ........................ 379/265 |
| 5,444,774 A | * | 8/1995 | Friedes |
| 5,675,637 A | * | 10/1997 | Szlam et al. |
| 5,867,562 A | * | 2/1999 | Scherer |
| 5,870,464 A | * | 2/1999 | Brewster |
| 5,987,118 A | * | 11/1999 | Dickerman et al. ......... 379/265 |

* cited by examiner

Primary Examiner—Fan Tsang
Assistant Examiner—Roland G. Foster
(74) Attorney, Agent, or Firm—Standley & Gilcrest LLP

(57) ABSTRACT

A system is disclosed in which a caller may provide certain information during a call to an interactive voice response unit, prior known information about the caller may be stored in a computerized database, and an agent terminal may access the information in the database and collected at the interactive voice response unit, during the call, such that information collected from the caller before arriving at the agent does not have to be recollected from the caller by the agent.

5 Claims, 4 Drawing Sheets

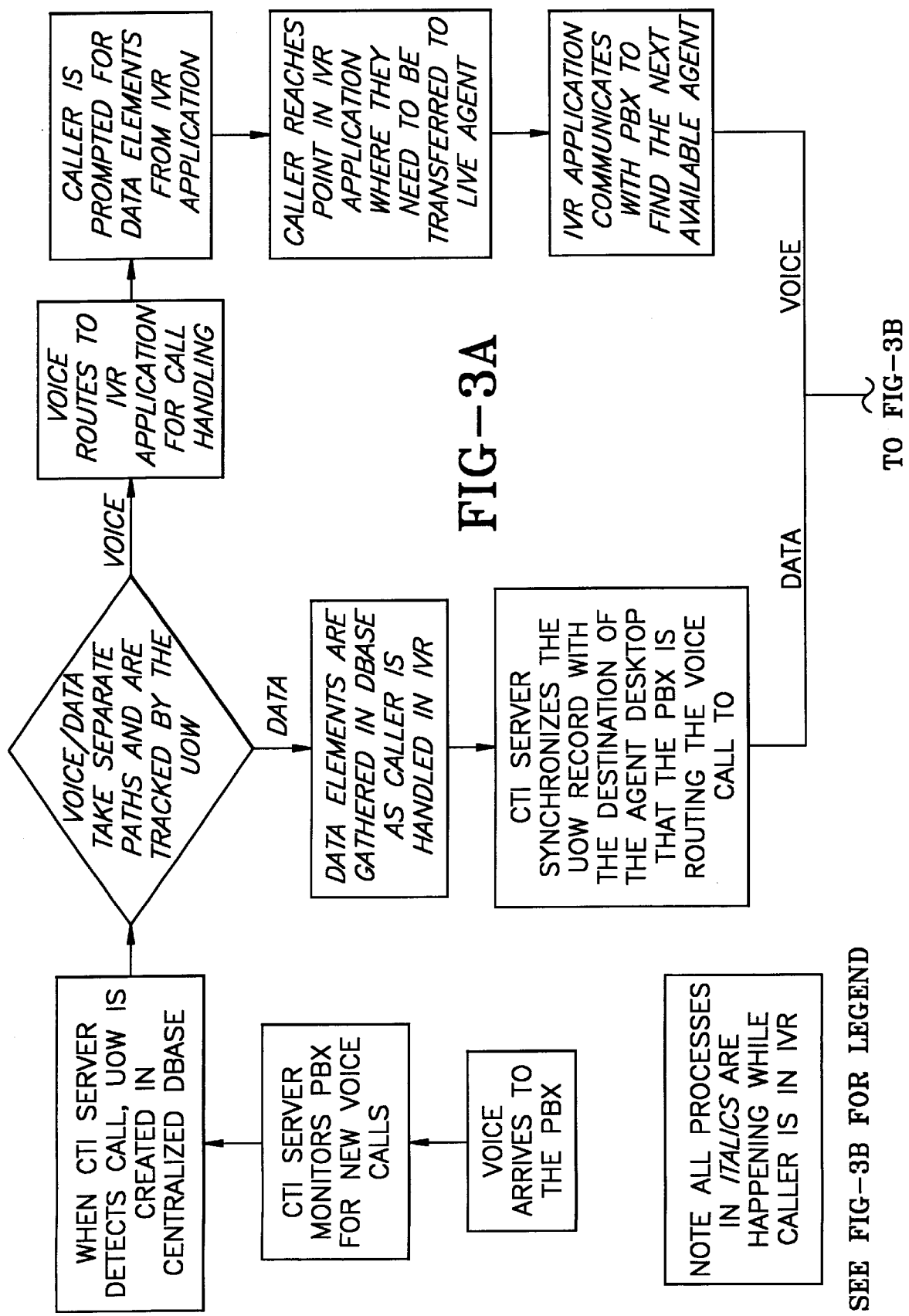

MACHINE ASSISTED SYSTEM FOR PROCESSING AND RESPONDING TO REQUESTS

BACKGROUND AND SUMMARY OF THE INVENTION

Many businesses, such as credit card companies, receive frequent requests for information of a type which requires a person's response to certain questions. The ability to provide this service via a telephone, the internet, or other various means is highly desirous. As the information requested becomes more complicated and the cost of person call handling greater, it is important to facilitate data input and enterprise wide data sharing of all data, including data newly created at and during the time of a call before the call is sent to persons. While fully automated self-service is often a goal, the complexity of many service offerings and the patience and skill of customers in providing self-service, typically result in many calls being unable to be fully automated. Therefore, when a call that begins as an automated call is routed to a person, it offers a great benefit if all data already provided by the caller is instantly also available to the person. By eliminating the need to repeat or re-enter data, including data provided just a few moments ago as well as the results of any manipulations of this data separately or in combination with other data such as real-time credit scoring or credit offer construction, the call is shorter and less costly and the caller is provided superior service. Also, the request can be routed more appropriately to a qualified person, by being able to access all data entered by the caller.

Ideally, the goal is to facilitate the response by minimizing the amount of data that must be re-created or created after the request is submitted, shorten the time required to process the response after it is received, and/or to fully automate the response to the request. It is advantageous, therefore, to have a system that recognizes the caller, and/or which creates a database of information about the caller and purpose of the call built from responses to questions provided by the caller during the current access (and, optionally, past accesses) to the system, prior as well as subsequent to the routing of the call to a person. Each time the caller uses the system, additional, relevant information may be stored and outdated information may be updated within the database. All of the information from the database, as well as the information gained from the responses of the caller during the current use of the system, may then be made available to postulate a resolution. Such a system, which preserves and makes immediately available to persons and enterprise processes all information newly created during the current call session, will save considerable time in responding to a caller, and may allow for responses to more complex requests.

The present invention satisfies the need for such a response system. When a person requests information from a business, for example, over the telephone, the call may be answered by an ACD (automatic call distributor) and transferred to an IVR (interactive voice response unit, also sometimes referred to as an ARU -automated response unit, or VRU- voice response unit). The IVR may be programmed to ask the caller questions and processes the caller's responses, until the caller answers all questions, abandons the call, or requests to speak to a person. The caller may respond to the questions by one of several methods. For example, responses may be entered by speaking in which case the IVR records the caller responses or has a speech recognition capability for determining the caller's responses, or by receiving touch tones from the caller responding by pushing buttons on the telephone touchpad. All information provided by the caller is captured and transformed preferably electronically (but may also be by manual entry via a computer keyboard into a computer system), from the initial input signal to a form that is usable in responding to the request. The information entered by the caller may be used for retrieving additional information from a preexisting database, constructed during the caller's past use of the system and/or constructed from prior data entry from other means, such as a live operator's manual entry of data.

Once the caller answers some or all of the questions, the request may be transferred to a person or a computer, either of which is able to access and use all of the information entered by the caller and retrieved from the database in order to formulate a response. If the caller terminates use of the system, the caller responses already entered may be retained in the database for future use. If it is required that the request be transferred to a second, or additional person or computer, or back and forth between persons and computers, the information entered by the caller and retrieved from the database will be accessible and usable in responding.

The system of the present invention is not limited to requests made by telephone. Requests may be submitted by sound, speech, electronic text, email, fax, internet, or any input from a human, machine, telephone, or computer that is processed by making use of a voice or data network or a device embedded in or attached to a network. As such, a caller may also respond to questions posed by the system in ways not involving the telephone. For example, a caller may make an entry into a computer-based application, or utilize another type of signaling device such as a tone generator.

The system of the present invention eliminates the redundant entering of information each time a caller accesses the system or moves from point to point in the system. By recognizing the caller, and retrieving relevant information, including, for example, any and all responses entered via the IVR, even those responses entered during prior calls abandoned by the caller, (that may be in, a preexisting database), a minimum amount of new information is required from the caller before a response can be generated. Thus, an accurate response can be provided to a caller in much less time. Additionally, because a significant amount of information about a caller may be maintained in a database, the system may also include the ability to process requests that require conclusions about the caller. For example, the system may further include the ability to obtain information from outside sources such as various credit bureaus, and to use this information in conjunction with the information retrieved from the database to perform the calculations necessary for the approval or denial of loans or credit card applications or dynamically created terms of an offer. The system in this manner becomes a vehicle for negotiations of transactions. Instead of merely accomplishing static data collection from caller responses, the present invention provides a system for dynamic negotiations to conclude a transaction while the system is live with the caller. By creating a packet of information in a computerized record, the caller's information entered during the call, collected from a database during the call, or collected from an outside source during the call) can travel with the call and be immediately accessible to all users of the system to respond to the caller's request.

DETAILED DESCRIPTION OF THE PREFERRED EMBODIMENT(S)

Figure 1:
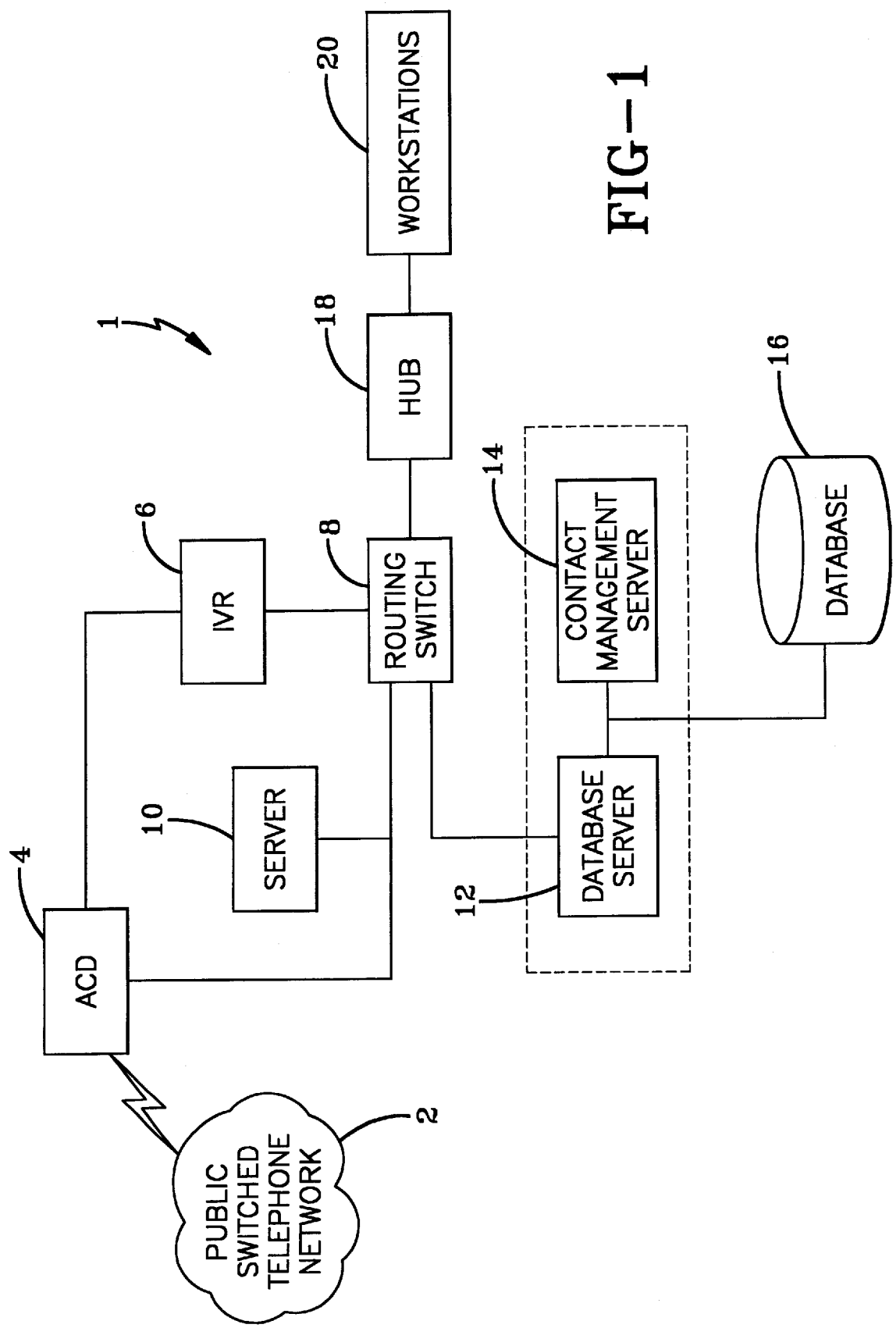
FIG. 1 shows a portion of the preferred embodiment of the present invention, wherein the system is configured to respond to requests for information.

A portion of the preferred embodiment of the system 1 of the present invention can be seen in FIG. 1. A caller request which may come through the public switched telephone network 2 is made to the system 1 via telephone, fax, internet, or various other means. An ACD 4 answers the request and transfers it to an IVR 6. The IVR 6 is able to identify the caller by responses the caller provides and/or by ANI (automatic number identification) verification known to those of ordinary skill in the art. The IVR 6 asks the caller questions and processes the caller's responses, until the caller answers all of the required questions, terminates the request, or requests to speak to a person. The responses to the questions asked by the IVR may be entered by any of various means, depending on the device used to make the request. For example, sound, speech, electronic text, email, fax, internet, or any input from a human, machine, telephone, or computer that is processed by making use of a voice or data network or a device embedded in or attached to a network may be used to respond to the IVR. The IVR 6 preferably has natural language voice recognition, such that it is able to respond to human speech. Once the required information is obtained from the caller, the IVR 6 routes the request to a server 10 coupled to a routing switch 8. Depending on the request made by the caller, additional information may be needed to formulate a response. The routing switch 8 is also coupled to a database server 12, which is controlled by a contact management system 14. The database server 12 contains information on the callers who use the system 1. Each time that a caller uses the system 1, any relevant information about the caller is stored in a database 16 within the database server 12. The next time that the caller uses the system 1, in a preferred embodiment of the present invention the collected information in the database 16 will be available for use along with the additional information obtained by the IVR in order to generate a response to the request.

The routing switch 8 may also be in communication with a hub 18 for distribution of the information. The hub 18 may be connected to any number of workstations 20 or other devices for displaying the information or for formulating a response. For example, if a caller wishes to speak to a person, any information that the caller has input to the system 1 during the call as well as any relevant information from the database 16 will be transferred to the person responding to the request. Each time the caller is transferred to another person, or between persons and computers, the relevant information may be transferred also.

Figure 2:
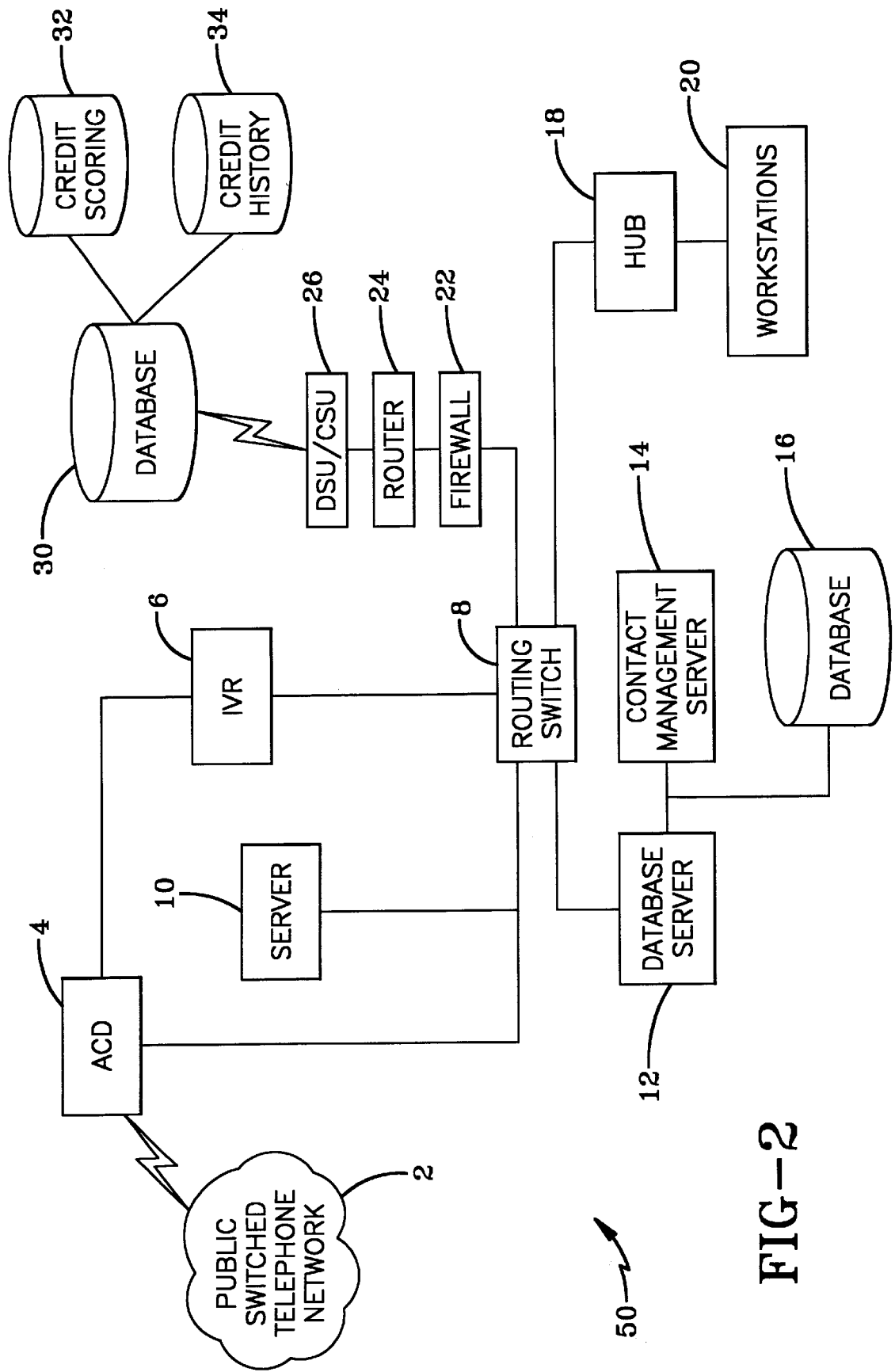
FIG. 2 depicts an alternate embodiment of the present invention, wherein the system of FIG. 1 is further provided to communicate with secondary information sources, such as credit bureaus; and, FIG. 3 shows a schematic representation of a preferred embodiment of the system of the present invention in which a unit of work information packet is created and travels with a call.

FIG. 2 is preferably identical to the embodiment of FIG. 1, with the added ability to communicate with at least one external, secondary information source. As in the above description, a request is sent to the system. The process for responding to the request follows the same steps as described for FIG. 1. For a complex request, such as, for example, a credit card application, additional information not available from the caller or from the database 16 may be required. In such a case, the system 1 may be provided with the ability to retrieve the information from another source.

As can be seen in the embodiment shown in FIG. 2, the system is designed to communicate with one or more outside sources, such as credit bureaus 30. A signal from the routing switch 8 preferably passes through a firewall 22 and into a router 24. The signal may then pass through a DSU/CSU 26 before reaching the credit bureaus 30. Various information about a caller, such as credit history 34 and credit scoring 32, may be obtained from the credit bureaus 30. The system 1 may then use the data from the credit bureaus 30 in conjunction with the information it already possesses to calculate a proper response to the request. Having the ability to access this additional information allows the system 1 to provide actual calculated responses. Without this ability, the system 1 would only be able to provide a generic response based on the information it currently had available, and the caller would have to wait until the necessary additional information was obtained. In such a case, an automated or instantaneous response would be impossible, as a person would likely have to obtain the additional information necessary to reach a conclusion.

The present invention allows a business or other entity to respond to requests for information in a more timely and efficient manner, and to make automated responses to requests that previously required human interaction. By capturing all of the information input by a caller and storing the relevant information in a database, the amount of data and time required to respond to a request can be minimized. Additionally, by providing the system with the ability to obtain information from outside sources, more complex requests can be handled by the system. Now instead of merely collecting data about a caller for later action, the present invention collects caller data, compares the data to other existing data, dynamically decides which questions to ask the caller based on the data provided by the caller and in view of the data accessed at an additional source, and provides the caller with a resolution during the call. This resolution may be, by example, a decision to increase the caller's credit line on a credit card.

Figure 3B:
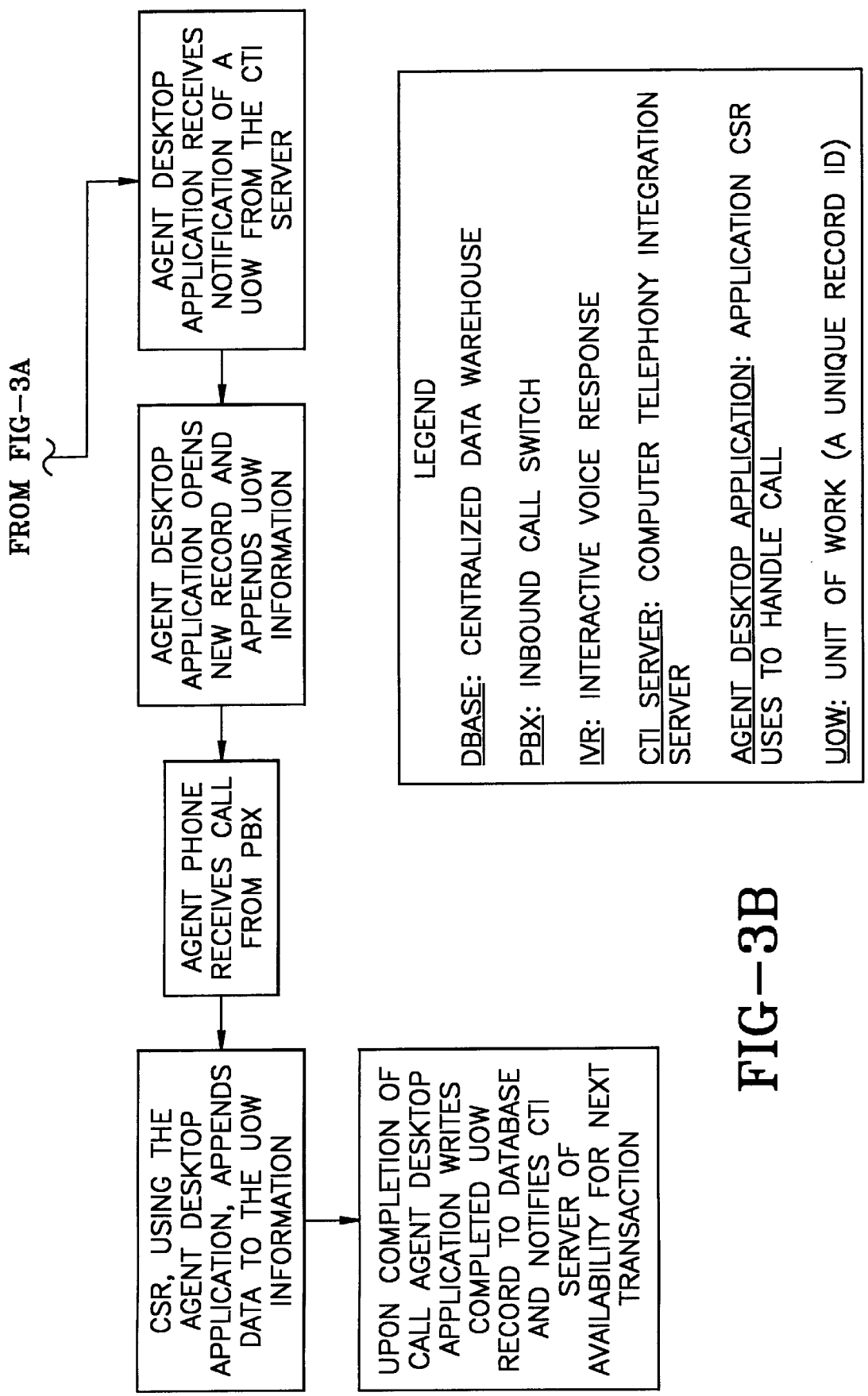

FIG. 3 shows another preferred embodiment of the present invention in which an unit of work (UOW) information packet is created for each call. The UOW includes the information collected from the caller by the IVR and may also include the relevant information pulled from an existing database during the call. If an outside source, such as a credit bureau is contacted during the call then the UOW may include this information also. The UOW is a unique record of the call and may be created in the centralized DBASE of the system. Data collected from these sources is written in real time to the UOW during the call. If the call is transferred to a live agent, the UOW goes with the call and the live agent thereby has access to all the information in the UOW. This is important because if the live agent has access to the answers the caller has provided before, then there is no need to repeat questions to the caller. The live agent can learn the caller's relevant information already collected and proceed to help the caller without unnecessary delay. The live agent may append data to the UOW that the live agent enters through his or her terminal keyboard as the live agent speaks with the caller. If the caller needs further assistance from another agent such as a supervisor, the call UOW may be transferred to the second agent for further handling and the entire data collected on the is caller will be immediately available to the second agent via the UOW.

Preferably, the system of the present invention is constructed to enable the UOW to be created automatically for each call at the time the call is received, via software running at a computer in the system and in electronic communication with the IVR and other system hardware. The software may be activated by the IVR or at a switch in a long distance carrier, or by a CTI server, upon answering the call and may use an electronic date-time stamp or unique identifier to start a unique call record. Caller responses and database information may be stored in the UOW automatically by electronic data transmission through the IVR.

The scope of the invention is not to be considered limited by the above disclosure, and modifications are possible without departing from the spirit of the invention as evidenced by the following claims.

What is claimed is:

1. A system for responding to a caller request, comprising:
   a communications system including at least one IVR connected to interact with said caller during a call;
   a database including existing data electronically accessible by said IVR;
   a source of additional data, said source of additional data electronically accessible by said IVR;
   a unit of work packet for storing information collected from said caller by said IVR, for storing relevant information from said database, and for storing relevant information from said source of additional data, said unit of work packet created at the time said call is received and adapted to be transmitted to a live operator station, said live operator station adapted to receive said unit of work packet during said call and adapted to be in communication with said caller;
   means for dynamically selecting questions asked by said IVR to said caller based on caller responses to said IVR, based on said existing data, and based on said additional data in view of said caller responses;
   means for appending to said unit of work packet during said call data entered by an agent at said live operator station; and
   means for resolving said caller's responses to provide said caller with a decision pertaining to said caller's request.

2. The system of claim 1 wherein an IVR identifies the caller.

3. The system of claim 2 wherein said IVR queries the caller for necessary information.

4. The system of claim 3 wherein a database is employed to store information about the callers using the system.

5. The system of claim 4 wherein said information obtained by said IVR is used to update and add to said database, in substantially real time, and said updated database is accessible via an agent's computer terminal during said call.

* * * * *